US005931679A

United States Patent [19]

Funahashi

[11] Patent Number: 5,931,679

[45] Date of Patent: Aug. 3, 1999

[54] INFORMATION PROVISION SYSTEM

[75] Inventor: Yasuhiro Funahashi, Nagoya, Japan

[73] Assignees: Brother Kogyo Kabushiki Kaisha, Nagoya, Japan; Xing Inc., Nagoya, Japan

[21] Appl. No.: 08/612,065

[22] Filed: Mar. 7, 1996

[30] Foreign Application Priority Data

Mar. 30, 1995 [JP] Japan .................................... 7-073223

[51] Int. Cl.[6] ................................ G09B 5/00; G10H 1/36

[52] U.S. Cl. .................................. 434/307 A; 434/307 R; 84/609; 455/4.2; 395/200.49; 348/7

[58] Field of Search ................................ 434/307 P–309, 434/318, 365; 84/454, 477 R, 601, 609–614, 615, 625, 645, 634–638; 370/449; 455/6.3, 4.2, 5.1; 340/825.08; 395/200.48, 200.49; 348/6, 7, 17, 8, 478, 484, 571, 598, 738

[56] References Cited

U.S. PATENT DOCUMENTS

| | | | |
|---|---|---|---|
| 5,153,917 | 10/1992 | Kato | 434/307 A X |
| 5,194,682 | 3/1993 | Okamura et al. | 434/307 A |
| 5,319,452 | 6/1994 | Funahashi | 434/307 A X |
| 5,335,073 | 8/1994 | Yamamoto | 434/307 A |
| 5,588,842 | 12/1996 | Nishimura et al. | 434/307 A |
| 5,613,192 | 3/1997 | Ikami et al. | 434/307 A X |
| 5,616,876 | 4/1997 | Cluts | 434/307 A X |
| 5,619,425 | 4/1997 | Funahashi et al. X | 434/307 A X |
| 5,663,515 | 9/1997 | Kato | 434/307 A X |
| 5,691,494 | 11/1997 | Sai et al. | 434/307 A X |
| 5,725,383 | 3/1998 | Funahashi et al. | 434/307 A |

FOREIGN PATENT DOCUMENTS

| | | | |
|---|---|---|---|
| 2 276 971 A | 12/1994 | United Kingdom | 434/307 A |

*Primary Examiner*—Joe H. Cheng
*Attorney, Agent, or Firm*—Oliff & Berridge, PLC

[57] ABSTRACT

An information provision system including: a plurality of information provision devices, each information provision device including: a memory for storing data; and an information processor for using the data stored in the memory to prepare external-output information; a transmission unit for conveying external-output information provided by the information provision devices; a plurality of output terminals in a number greater than the plurality of information provision devices, each output terminal including: a keyboard by which requests are inputted; request transmission unit for transmitting, according to commands inputted via the keyboard, requests; and output device for outputting information based on external-output information; and a central control device including: request receiver for receiving requests transmitted from the request transmitter; a priority storage unit for storing, for each output terminal, a priority level at which external-output information is to be provided; and command unit for commanding, according to requests and according to priority level stored for requesting output terminals, an information provision device to provide external-output information requested in a request received by the request receiver.

19 Claims, 9 Drawing Sheets

FIG. 9

| TERMINAL NUMBER | PRIORITY LEVEL |
|---|---|
| 1 | C |
| 2 | C |
| 3 | A |
| 4 | B |
| ⋮ | ⋮ |
| N−1 | B |
| N | C |

INFORMATION PROVISION SYSTEM

BACKGROUND OF THE INVENTION

1. Field of the Invention

The present invention relates to an information provision system and more particularly to an information provision system providing information from a central unit to a plurality of terminals.

2. Description of the Related Art

Conventionally, there has been known a central management type karaoke system including a central device storing karaoke performance data and a plurality of karaoke devices for executing karaoke performances based on karaoke performance data distributed from the central device. In this central management type karaoke system, requests are inputted at the karaoke devices. The karaoke devices transmit the requests to the central device, which transmits the requested karaoke performance data to the requesting karaoke device. The karaoke device receives the karaoke performance data and executes a karaoke performance accordingly. Central management karaoke systems can provide services other than karaoke, such as video games, fortune-telling, quizzes, and video transmission.

Central management karaoke systems are advantageous because the burden of storing and maintaining all the karaoke performance data is taken on by one device only: the central device. Because the karaoke devices need store only karaoke performance data being used for the present karaoke performance, karaoke devices need only be capable of storing a relatively small amount of data.

SUMMARY OF THE INVENTION

Establishments where the sole objective of customers is enjoying karaoke often provide an individual karaoke device to each room of the establishment. In such establishments, the karaoke devices are frequently in operation, often all at the same time.

The present invention is an information provision system including a plurality of information provision devices for providing external-output information, each information provision device including: memory means for storing data; and information processing means for using the data stored in the memory means to prepare external-output information; a transmission unit for conveying external-output information provided by the information provision devices; a plurality of output terminals in a number greater than the plurality of information provision devices, each output terminal including: input means by which requests for provision of external-output information are inputted; request transmission means for transmitting, according to commands inputted via the input means, requests for provision of external-output information; and outputting information based on external-output information received from an information provision device via the transmission unit; and a central control device including: request receiving means for receiving requests transmitted from request transmission means; a priority storage means for storing, for each output terminal, a priority level at which external-output information is to be provided; and command means for commanding, according to requests received by the request receiving means and according to priority level stored for requesting output terminals, an information provision device to provide external-output information requested in a request received by the request receiving means.

According to another aspect of the present invention, it is desirable that the transmission unit be a multi-channel unit for conveying external-output information over channels allotted to respective information provision devices; that each output terminal further include: channel selection means connected to the multi-channel transmission device and for selecting a channel of the plurality of channels; and channel command means for commanding the channel selection means to select a channel over which external-output information is to be conveyed by the transmission unit; that the information output means externally outputs information based on external-output information received from the transmission unit over a channel selected by the channel selection means; and that the central control device further include channel notification means for notifying a requesting output terminal an allotted channel over which external-output information from a selected information provision device will be transmitted, the channel command means of the requesting output terminal commanding the channel selection means of the requesting output terminal to select a channel accordingly.

According to a further aspect of the present invention, it is desirable that the command means commands an information provision device based on priority level stored in the priority storage means when the request receiving means receives a plurality of requests within a predetermined duration of time.

According to a still further aspect of the present invention, it is desirable that the priority storage means further stores a highest-priority level for a highest-priority output terminal of the output terminals; and that the command means gives priority to a request from the highest-priority output terminal over requests from other output terminals when commanding information provision devices to provide external-output information.

According to a still further aspect of the present invention, it is desirable that wherein an exclusive information provision device of the plurality of information provision devices be fixedly set for executing information processes exclusively for the highest-priority output terminal, the command means commanding the exclusive information provision device to provide external-output information in response to a request from the highest-priority output terminal and commanding an information provision device other than the exclusive information provision device to provide external-output information in response to a request from an output terminal other than the highest-priority output terminal.

According to the present invention, requests from different output terminals are not processed equally but on a priority bases. For example, requests from high-priority output terminals are given priority when processed. If requests are received from five different output terminals over a predetermined period of time, but only one data provision device is provided for commanding execution of information processing, the one data provision device provides information for the request from the output terminal with the highest priority setting. That is, even if the system is set up to normally process requests in the order received, when many requests are received within a predetermined duration of time, a request from a high-priority output terminal is processed before one from a low-priority output terminal, even if the request from the low-priority output terminal was received first.

BRIEF DESCRIPTION OF THE DRAWINGS

The above and other objects, features and advantages of the invention will become more apparent from reading the following description of the preferred embodiment taken in connection with the accompanying drawings in which:

FIG. 9 is a table showing an information provision priority table, stored in a RAM of the central control device, indicating a priority level for each karaoke terminal.

DETAILED DESCRIPTION OF THE PREFERRED EMBODIMENTS

Figure 1:
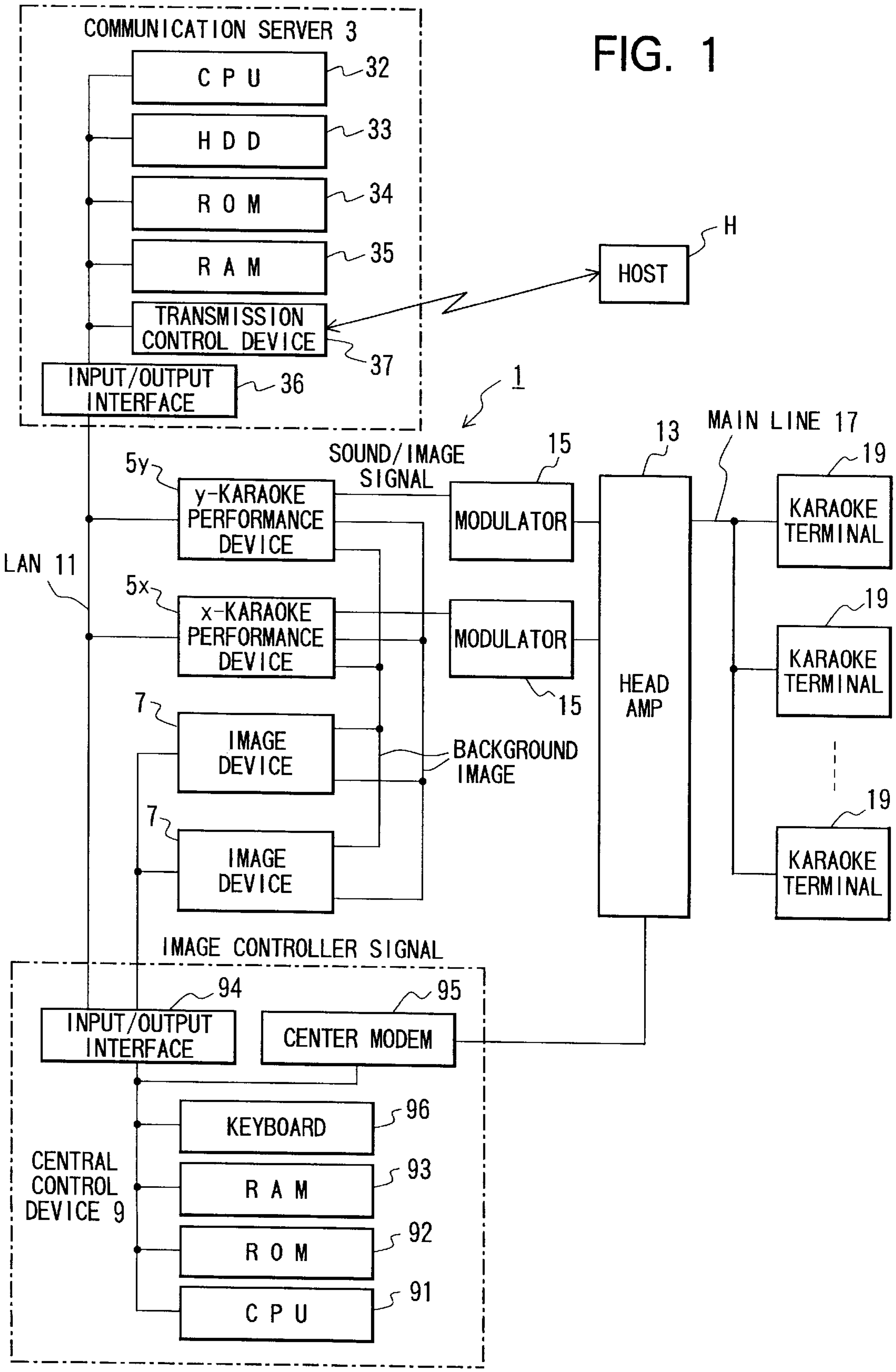
FIG. 1 is a block diagram showing configuration of a karaoke information provision system according to an embodiment of the present invention.

An information provision system according to a preferred embodiment of the present invention will be described while referring to the accompanying drawings wherein like parts and components are designated by the same reference numerals to avoid duplicating description.

As shown in FIG. 1, an information provision system 1 according to the present invention includes a communication server 3, a plurality of karaoke performance devices 5 serving as information provision devices, a plurality of image devices 7, and a central control device 9. The communication server 3 stores a quantity of karaoke song data in a hard disk 33. The plurality of karaoke performance devices 5 prepare and output karaoke performance information based on karaoke song data retrieved from the hard disk 33 of the communication server 3. The plurality of image devices 7 reproduce, as background image information, animated images stored in an image storage medium (not shown in the drawings) such as a compact disk or a laser disk and output the animated images to the karaoke performance devices 5. The central control device 9 controls the system by transmitting commands and the like to the communication server 3, the karaoke performance devices 5, and the image devices 7. The central control device 9, the communication server 3, and the karaoke performance devices 5 are all connected to each other through a local area network (LAN) 11.

The communication server 3 includes a CPU 32; the hard disk 33; a ROM 34 storing operation programs and the like of the CPU 32; a RAM 35 for temporarily storing data and the like derived from calculation processes and the like performed at the CPU 32; an input/output interface 36; and a transmission control device 37. The input/output interface 36 is connected to the LAN 11 so that the CPU 32 can transmit data to, and retrieve data from, the LAN 11 via the input/output interface 36. The transmission control device 37 is for performing transmission with a host computer H via a transmission circuit such as a telephone line. The CPU 32 can therefore transmit and receive data and the like to and from the host computer H using the transmission control device 37.

The hard disk 33 stores karaoke song data for several thousand to ten thousand songs. The hard disk 33 can also store data for new karaoke songs transmitted from the host computer H by the above-described transmission between the CPU 32 and the host computer H. One song's worth of karaoke song data includes song number data, which is distinction information for distinguishing between different karaoke songs, and actual song data for the karaoke performance. The actual song data includes Musical Instrument Digital Interface (MIDI) performance data, which forms instrumental music information, and lyric data, which forms the lyrics of the song in data form. Although not in the present embodiment, the actual song data can also include background image data, which is encoded image information corresponding to each song.

The central control device 9 is a microcomputer including a CPU 91, a well-known ROM 92, and a RAM 93. An input/output interface 94 connects the central control device 9 to the LAN 11 and the image devices 7. A center modem 95 connects the central control device 9 to a head amp 13. The center modem 95 is capable of modulating digital signals into high frequency signals and demodulating high frequency signals into digital signals. The central control device 9 is also provided with a keyboard 96. As will be described later, the RAM 93 stores an information provision priority table listing information on priority levels of each karaoke terminal 19. The information in the information provision priority table can be changed by operating the keyboard 96.

The karaoke performance devices 5 are connected to the head amp 13 by modulators 15 for modulating analog signals to a predetermined high frequency signal.

The head amp 13 is capable of multiplexing signals from the modulators 15 and from the center modem 95 and transmitting the multiplexed signals over allotted channels via the main line 17, which is a coaxial cable. Karaoke terminals 19 are connected to the head amp 13 via the main line 17 so as be capable of receiving signals transmitted over the main line 17. In the present embodiment, one karaoke terminal 19 is provided to each room, for example, of a drinking establishment or of a hotel. It should be noted that more karaoke terminals 19 are provided than karaoke performance devices 5. The head amp 13 is also capable of relaying, to the center modem 95, signals transmitted from the karaoke terminals 19.

The karaoke terminals 19 can transmit and receive signals over a plurality of channels via the head amp 13 and the main line 17. On the other hand, each of the karaoke performance devices 5 is allotted a single channel. Karaoke information (referred to as performance sound/image signals hereinafter) transmitted from any particular karaoke performance device 5 can be retrieved at a karaoke terminal 19 by setting the karaoke terminal 19 to the channel allotted to the particular karaoke performance device 5.

A channel is allotted for transmitting polling signals from the central control device 9 to the karaoke terminals 19 via the center modem 95. Another channel is allotted over which the central control device 9 receives from the karaoke terminals 19 response signals such as requests with regards to a particular polling signal. The central control device 9 determines whether or not a request can be accepted based on the present operation condition of the karaoke performance devices 5. The central control device 9 adds this information to a polling signal and transmits it to the requesting karaoke terminal 19.

Figure 2:
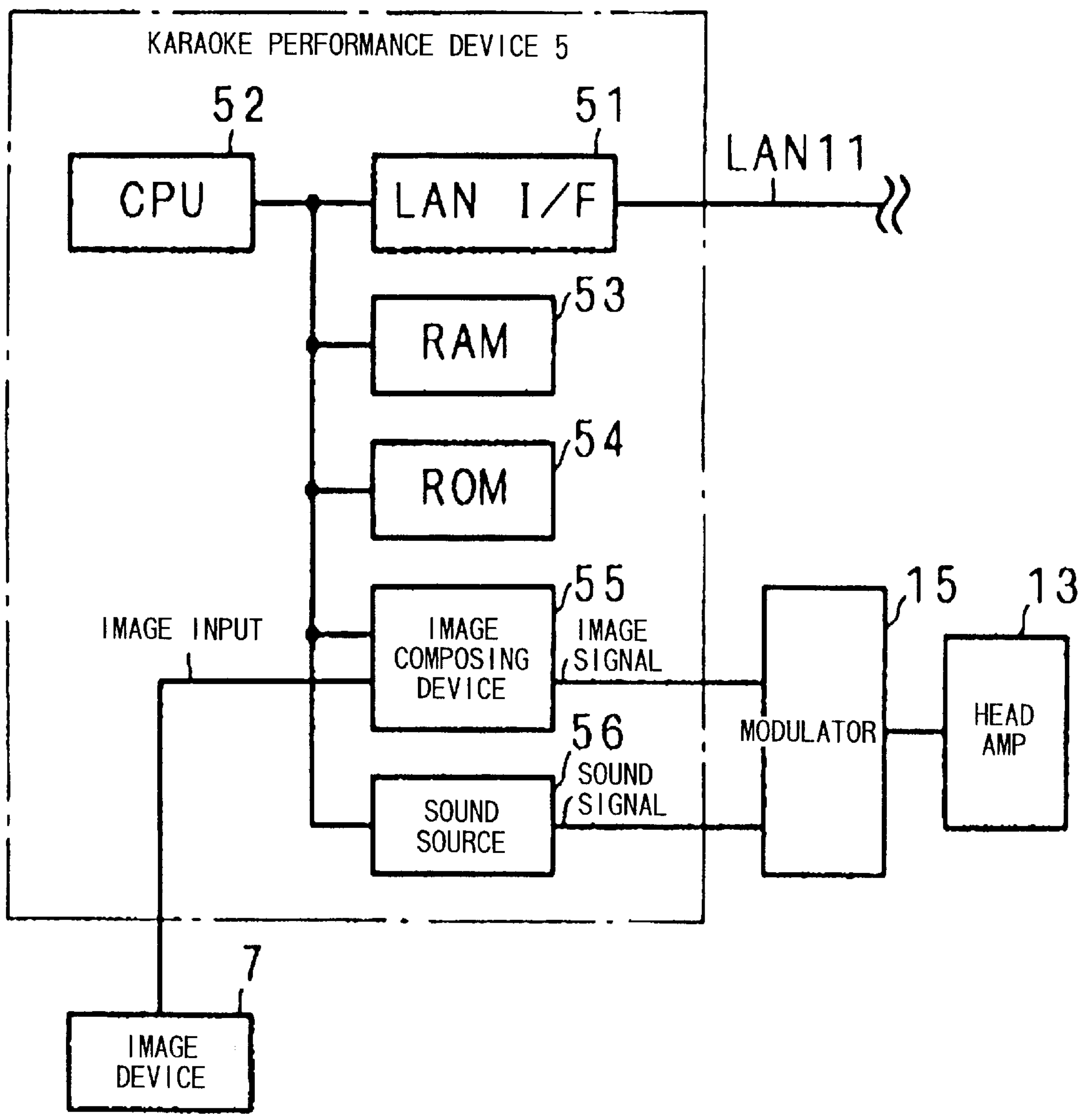
FIG. 2 is a block diagram showing components of a karaoke performance device of the karaoke information provision system of FIG. 1.

As shown in FIG. 2, each of the karaoke performance devices 5 includes a LAN interface 51, a CPU 52, a well-known RAM 53, a well-known ROM 54, an image composing device 55, and a sound source 56. The LAN interface 51 is for performing transmission with the communication server 3 and the central control device 9 via the LAN 11.

The CPU 52 is capable of receiving karaoke song data from the communication server 3, then conveying the performance data component to the sound source 56 and the lyric data component to the image composing device 55. Also, when the CPU 52 receives other types of data, such as for a video game program, the CPU 52 executes processes according to the other type of data.

The sound source 56 is capable of converting digital performance data into an analog performance sound signal and outputting the signal to the modulators 15. The image composing device 55 is capable of transmitting to the modulators 15 an analog signal formed by superimposing lyric data onto a background image signal outputted to the karaoke performance device 5 from the image device 7.

Figure 3:
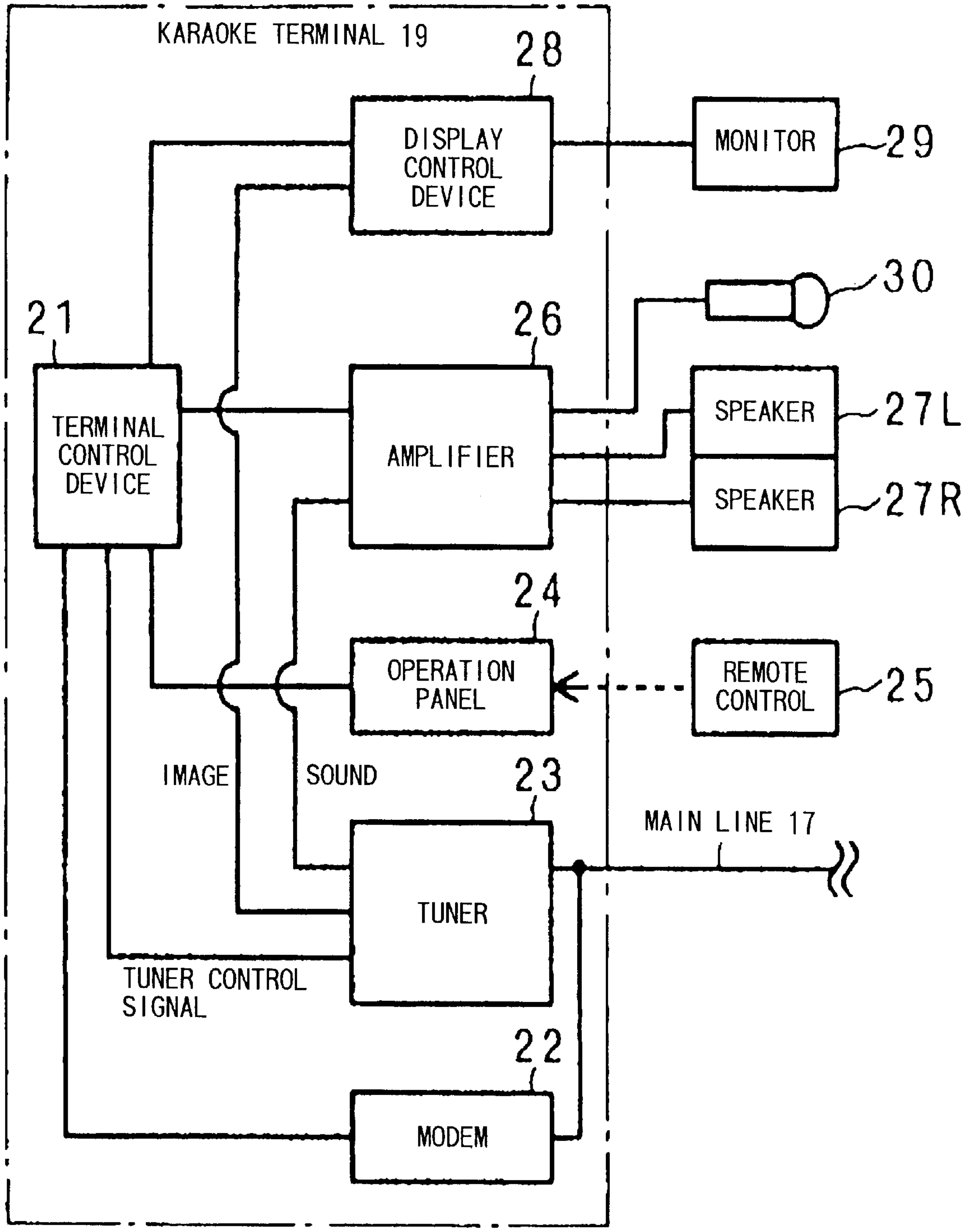
FIG. 3 is a block diagram showing components of a karaoke terminal of the karaoke information provision system of FIG. 1.

As shown in FIG. 3, each of the karaoke terminals 19 is provided with a terminal control device 21. The terminal control device 21 is a microcomputer including a CPU, a ROM, a RAM, and the like, none of which are shown in the drawings. The terminal control device 21 controls operations of various portions of the corresponding karaoke terminal 19.

The terminal control device 21 is connected to the main line 17 via a modem 22. The modem 22 is capable of modulating digital signals into high frequency signals and demodulating high-frequency signals into digital signals so that transmission between the central control device 9 and the karaoke terminals 19 is possible over the main line 17. The modem 22 receives and demodulates polling signals transmitted over the main line 17 from the central control device 9 and modulates response signals outputted from the terminal control device 21 and transmits the modulated response signal to the central control device 9. A response signal is for answering a polling signal transmitted from the central control device 9 as to whether or not a user has inputted a song request. When a song has been requested, the request signal includes request data such as the song number of the requested song.

A tuner 23 for modulating a high-frequency signal transmitted over the main line 17 on a selected channel and outputting the high-frequency signal to an amp 26 or to a display control device 28. Using a tuner control signal, the terminal control device 21 indicates to the tuner 23 the channel to be selected for transmitting the high-frequency signal.

A control panel 24 is connected to the terminal control device 21. A user can input requests for songs and the like by operating a number pad (not shown in the drawings) of the control panel 24. Requests and the like can also be inputted using a remote control unit 25. Requests and the like inputted using the control panel 24 and the remote control unit 25 are transmitted to the central control device 9 via the modem 22 after being received by the terminal control device 21.

An amplifier 26 is connected to the terminal control device 21. A pair of left and right speakers 27L and 27R are connected to the amplifier 26 and are capable of outputting sound based on electric signals from the amplifier 26.

The tuner 23 is capable of transmitting sound signals, produced by demodulating received high-frequency signals, to the amplifier 26. The amplifier 26 mixes the sound signal with a voice signal inputted from a microphone 30 and then amplifies and outputs the result to the speakers 27L, 27R.

A display control device 28 is connected to the terminal control device 21 and to the tuner 23. Image signals received and demodulated at the tuner 23 are transmitted to the display control device 28. A monitor 29 is connected to the display control device 28. The display control device 28 is capable of displaying on the monitor 29 images based on image signals transmitted from the tuner 23 and commands from the terminal control device 21.

Figure 4:
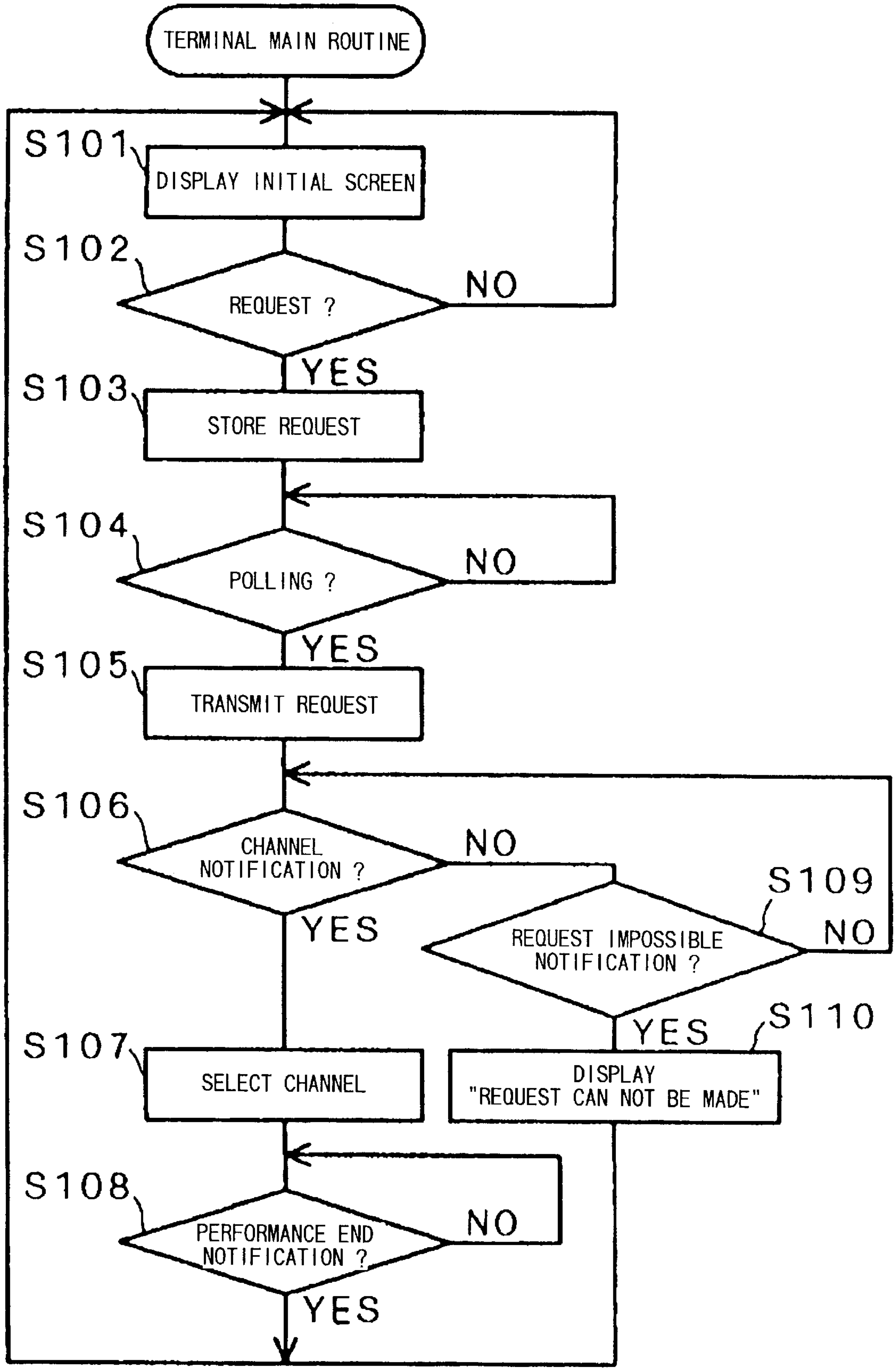
FIG. 4 is a flowchart representing a main routine performed at the karaoke terminal.
Figure 5:
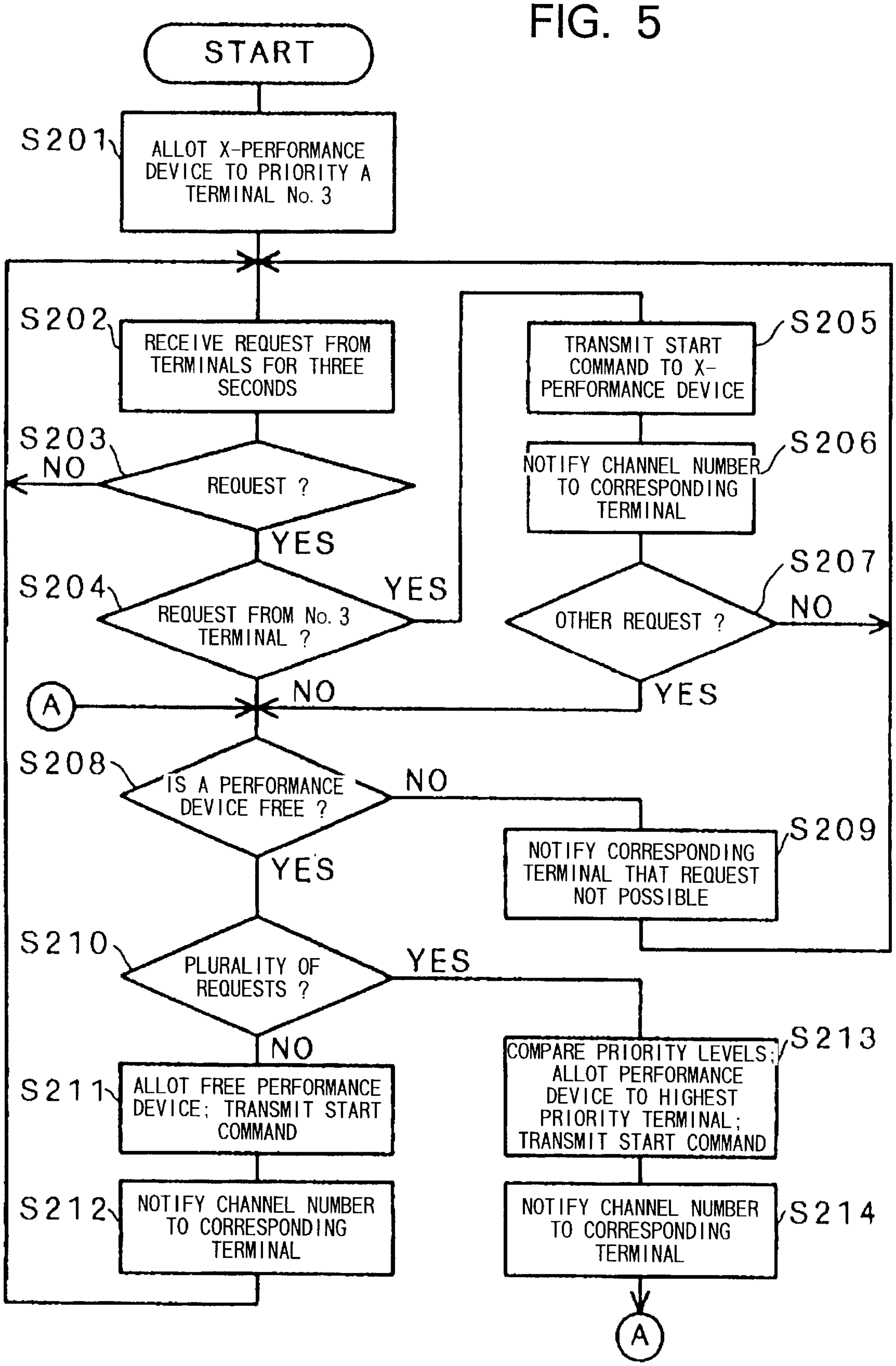
FIG. 5 is a flowchart representing a main routine performed in a central control device of the karaoke information provision system of FIG. 1.
Figure 6:
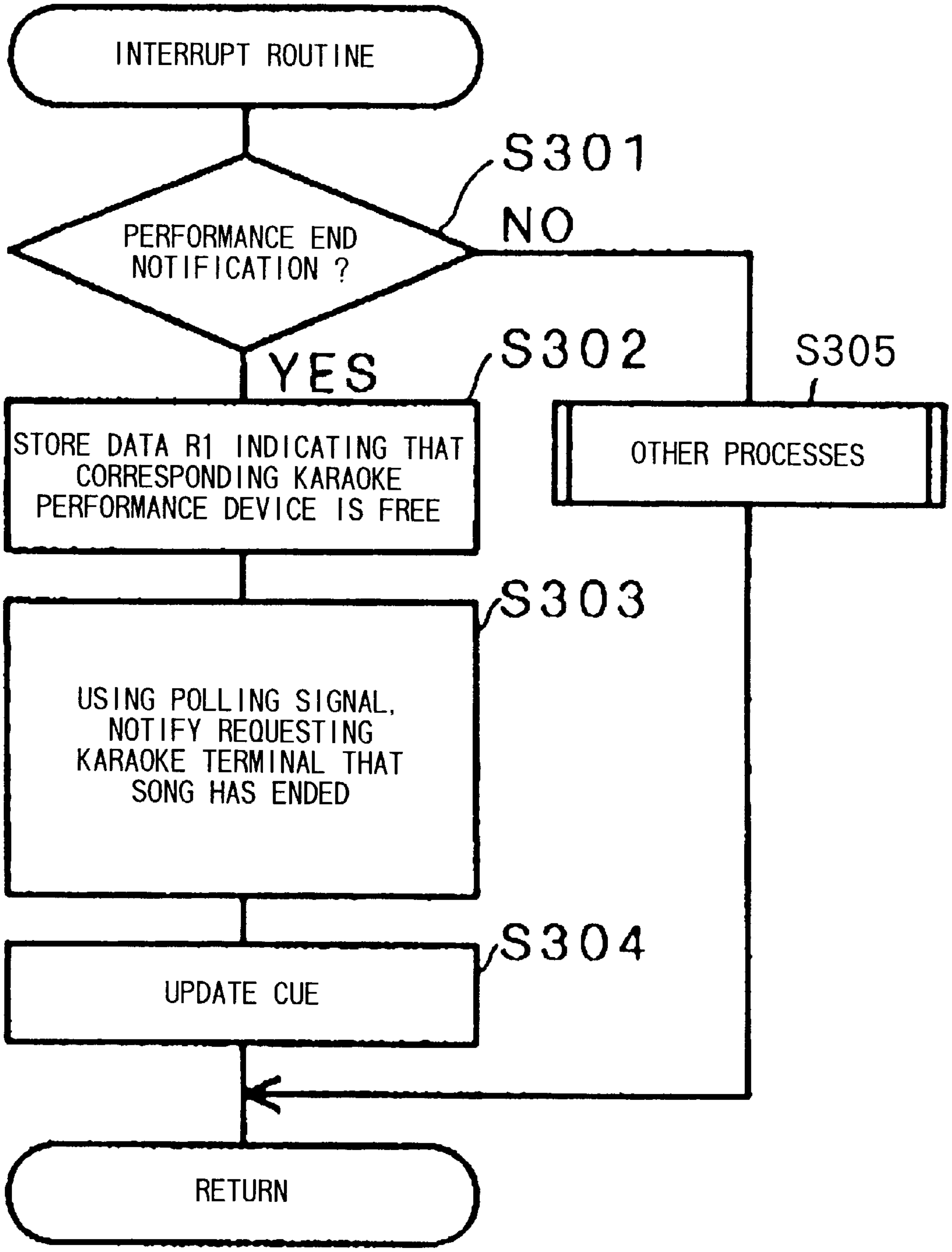
FIG. 6 is a flowchart representing an interrupt routine performed in the central control device.
Figure 7:
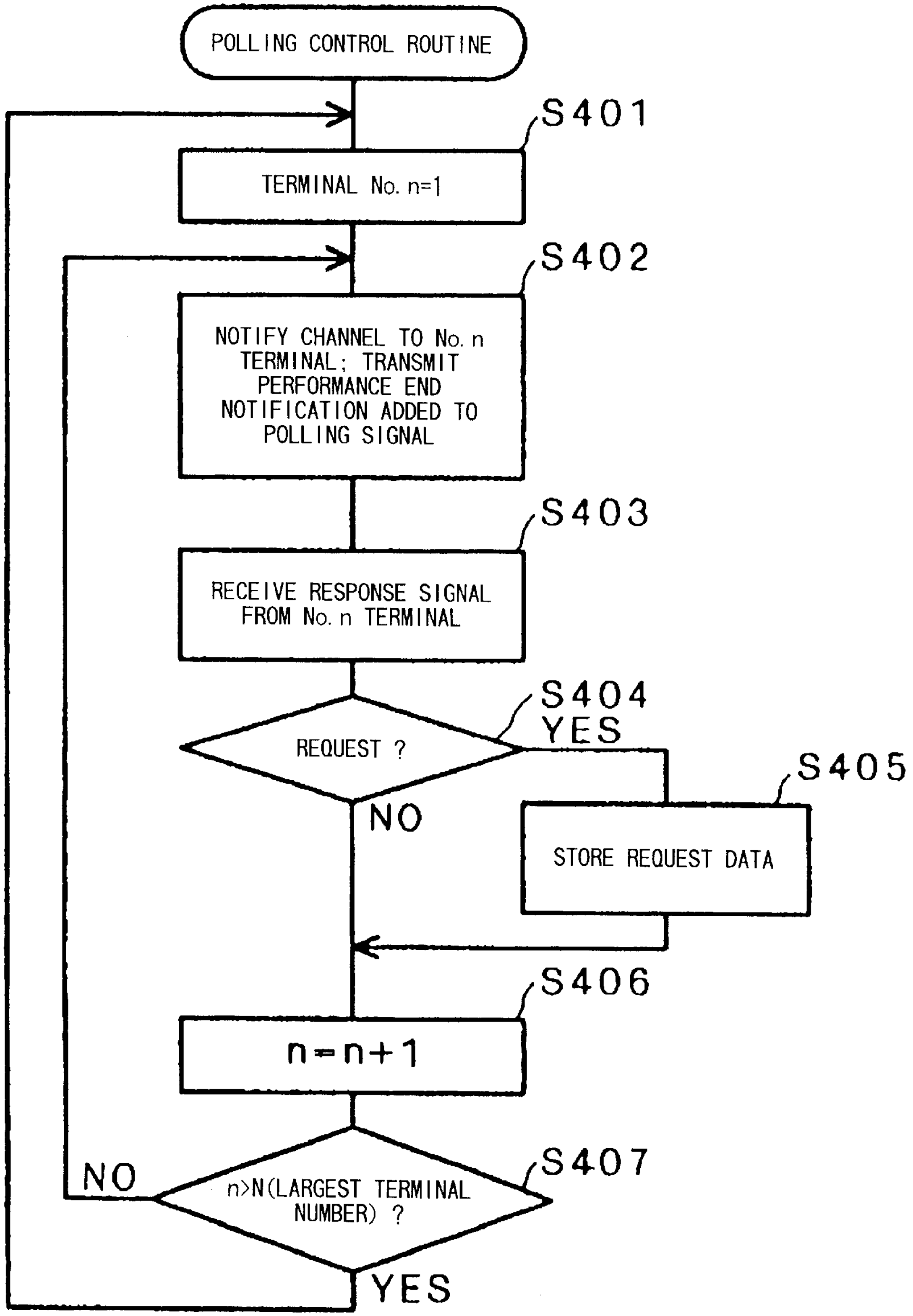
FIG. 7 is a flowchart representing a polling routine performed in the central control device.
Figure 8:
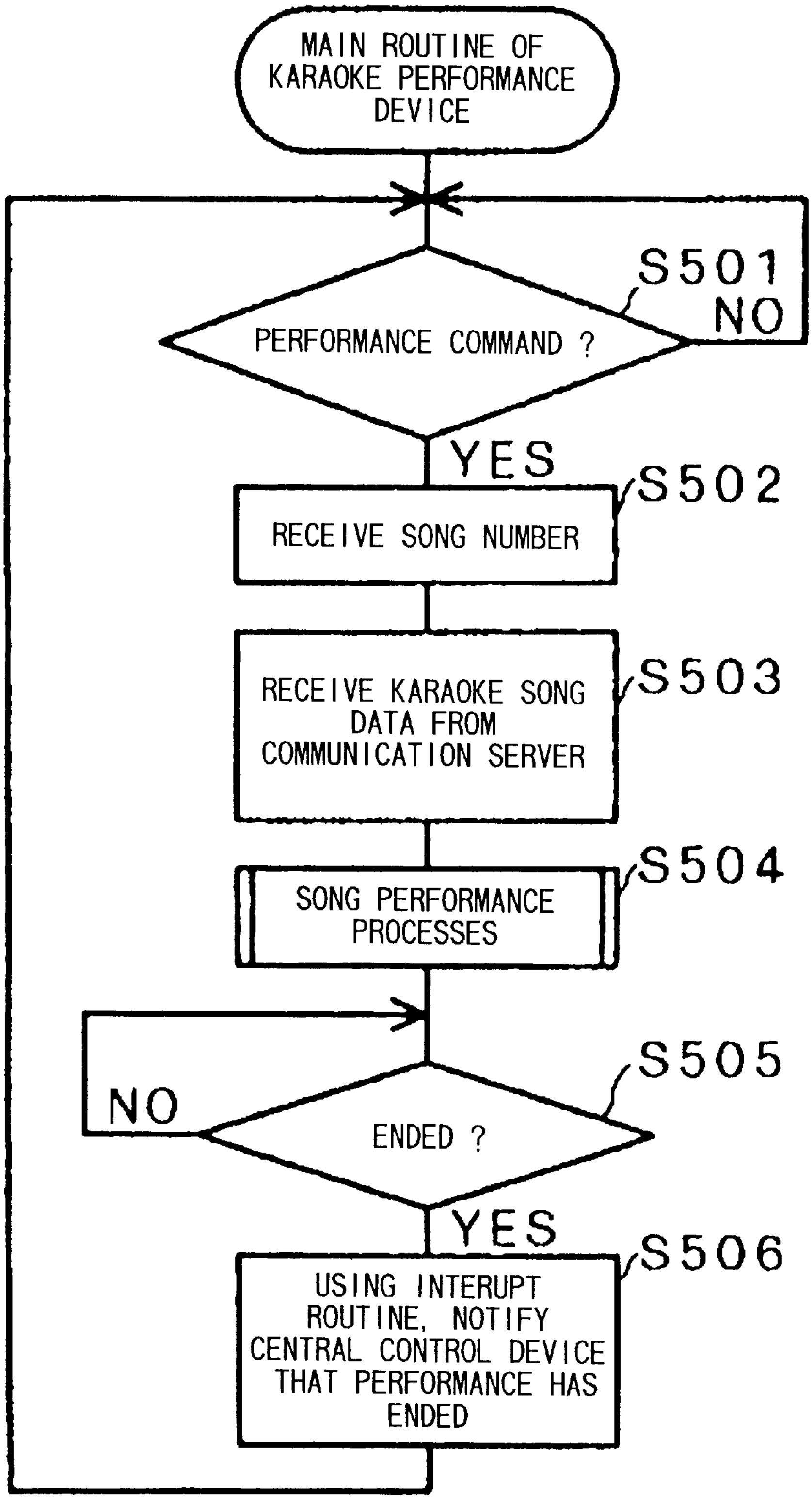
FIG. 8 is a flowchart representing a main routine performed in a central control device of the karaoke performance device.

Next, an explanation of operations performed by the information provision system 1 will be provided while referring to the flowcharts shown in FIGS. 4 through 8 and the table shown in FIG. 9. Individual steps of the various routines represented by these flowcharts will be referred to hereinafter as Si wherein i represents the number of the individual step. It should be noted that the routine represented in FIG. 4 is executed by the terminal control device 21 of each karaoke terminal, the routines represented in FIGS. 5 through 7 are executed by the CPU 91 of the central control device 9, and the routine represented in FIG. 8 is executed by the CPU 52 of each karaoke performance device 5. The table shown in FIG. 9 represents the information provision priority table stored in the RAM 93 as mentioned above. These routines are intimately related so corresponding drawings will be referred to as occasion demands.

First, the processes performed in the karaoke terminals 19 will be explained. As shown in FIG. 4, the terminal control device 21 of the karaoke terminals 19 displays in S101 an initial screen for urging a user to input a request and waits in S102 for the user to input a request by manipulating the control panel 24 or the remote control unit 25. When a request is inputted (S102:YES), the song number of the requested song is stored in S103. Then the terminal control device 21 waits in S104 for a polling signal from the central control device 9. When the terminal control device 21 receives a polling signal from the central control device 9 (S104:YES), the terminal control device 21 adds the song number of the requested song to a response signal, which serves as an answer to the polling signal, and transmits it in S105 to the central control device 9 via the modem 22 to request provision of data.

Then, the terminal control device 21 waits in S106 for the central control device 9 to transmit a channel notification. When the terminal control device 21 receives a channel notification (S1O6:YES), then in S107 it indicates the selection of the channel to the tuner 23, whereupon the tuner 23 demodulates a performance signal transmitted on the selected channel over the main line 17. The terminal control device 21 then operates the display control device 28 and the amplifier 26 to output from the speakers 27L, 27R music based on the performance signal. The tuner 23 also demodulates an image signal transmitted on the selected channel over the main line 17. A composite image formed from lyric and background animation based on the image signal is displayed on the monitor 29. As a result, the lyrics are displayed in synchronization with the sound output of the karaoke performance. The user can sing into the microphone 30 while referring to the lyrics on the monitor 29. The sound signal from the microphone 30 is mixed with the performance signal at the amplifier 26 and outputted from the speakers 27L, 27R. Next, the terminal control device 21 waits in S108 for notification from the central control device 9 that the performance has been completed. When notification is received (S108:YES), the program returns to S101. The notifications for channel in S106 and end of performance in S108 are performed by a polling interrupt routine to be described later while referring to the flowchart shown in FIG. 8.

The processes described with reference to the flowchart of FIG. 4 are performed when the center is not fully booked and so is able to accept all requests. As mentioned above, more karaoke terminals 19 are provided than karaoke performance devices 5. This is advantageous for establishments, such as hotels or multi-roomed drinking establishments, with various objectives other than providing karaoke to customers. With such establishments it can be assumed that normally not all of the karaoke terminals 19 will be in use so providing an equal number of karaoke performance devices 5 is unnecessary. However, even though operation rate of the karaoke terminals 19 is low for an establishment overall, because more karaoke terminals 19 are provided than karaoke performance devices 5 for reasons of the establishment's location or objectives, situations will arise when more requests are received than the karaoke performance devices 5 so that not all requests can be fulfilled.

Next, an explanation of the situation when the center is fully booked and can not accept any further requests will be provided. After a request is transmitted in S105, then whether or not channel notification has been received is determined in S106. If not (S106:NO), then the terminal control device 21 proceeds to S109, where whether or not a request impossible notification has been received is determined. If no request impossible notification has been received (S109:NO), then the terminal control device 21 returns to S106. That is, the terminal control device 21 transmits a request and then waits until either a channel notification or a request impossible notification is received.

When a request impossible notification is received (S109:YES), then the terminal control device 21 displays in S110 on the monitor 29 a message indicating that requests can not be accepted. This message indicates that at present reservations for requests are fully booked so that no new requests can be accepted. After the message is displayed on the monitor 29 for a predetermined duration of time, the terminal control device 21 returns to S101, displays the initial screen again and waits for input of a new request.

The main routine represented in FIG. 5 for the central control device 9 indicates priority levels in the central control device 9 after the priority levels have been changed. Therefore, before explaining processes executed by the central control device 9 and the karaoke performance devices 5, priority level will be explained to facilitate understanding of the present invention. In the present embodiment, a priority level at which requests transmitted from the karaoke terminals 19 are accepted is set for each karaoke terminal 19. FIG. 9 shows an example of priority levels that may be set for the karaoke terminals 19. FIG. 9 is an information provision priority level table storing priority level at which information is provided to each of the karaoke terminals 19. A priority level of A, B, or C is set for each of the karaoke terminals 1 through N.

The priority level A is the highest priority level. In the present embodiment, one of the karaoke performance devices 5 is constantly allotted for a karaoke terminal 19 set with the priority level A. That is, this karaoke performance device 5 is not operated for requests from karaoke terminals 19 other than those set with a priority level A. The priority level C is the lowest priority level. The priority level B is an intermediate priority level. Within predetermined conditions, the central control device 9 gives priority to karaoke terminals 19 set with the priority level B over karaoke terminals 19 set with the priority level C when allotting karaoke performance devices 5. One of the priority levels A, B, or C is set for each of the karaoke terminals 19 by the proprietor of the establishment using the information provision system 1.

Assuming a hotel provides a karaoke terminal 19 to each room, in certain situations, more requests will be made at the karaoke terminals 19 than there are karaoke performance devices 5 to fulfill the requests. In such situations, some customers must be made to wait for their request to be answered. When karaoke is the central event of a gathering such as a party, having to wait for karaoke songs can ruin the atmosphere of the party. Therefore, the effect of waiting is greater in banquet halls than in other rooms. Also, among the same residential rooms, some rooms, such as suites, are more expensive with the assumption that service will be superior for those rooms. If the occupant of the expensive suite is inconvenienced by being kept waiting in the same manner as in any other room, staying in a suite loses part of its meaning.

Therefore, a banquet hall where parties are held could be set with priority level A, suite rooms or other special rooms could be set with priority level B, and normal occupancy rooms could be set with priority level C. The proprietor of the hotel can change priority level optionally by operating the keyboard 96.

It will be assumed for the following explanation that, as shown in FIG. 9, of the karaoke terminals 19 numbered 1 through N, terminal No. 3 is set with a priority level A, terminal Nos. 4 and N-1 are set with priority level B, and all other terminal numbers are set with priority level C.

Next, an explanation of processes executed by the central control device 9 and the karaoke performance devices 5 will be provided. The CPU 91 of the central control device 9 normally executes processes of a main routine represented by the flowchart of FIG. 5. However, the CPU 91 executes the interrupt program represented by the flowchart in FIG. 6 when one of the karaoke performance devices 5 outputs an interrupt command in a S506 of the routine represented by the flowchart in FIG. 8. The CPU 91 also executes, with regards to each karaoke performance device 5, the polling control routine represented by the flowchart in FIG. 7. Because the processes represented by flowcharts of FIGS. 5, 6, and 7 are intimately related, the following explanation will be provided while referring to all three of these flowcharts. Further, each karaoke terminal 19 performs the routine represented by the flowchart of FIG. 8 as a result a start command produced by the central control device 9 in the main routine represented in FIG. 5. To facilitate understanding of these various processes, the following explanation will be provided following the flow of processes rather than the numerical sequence of the process steps.

First, the main routine will be explained while referring to the flowchart of FIG. 5. First in S201, an X-karaoke performance device **5*x* is allotted to the terminal number set in the information provision priority table with priority level A, which in this example is the terminal No. 3. The X-karaoke performance device 5*x* is allotted exclusively for handling requests received from the No. 3 karaoke terminal 19**.

Next, requests from all terminals are received for three seconds in S202. Then whether or not a request has been received is determined in S203. If not, the program returns to S202 and receives requests for a further three seconds.

If a request is received (S203:YES), then whether or not one of the requests is from the No. 3 karaoke terminal 19 is determined in S204. If so (S204:YES), the X-karaoke performance device **5*x* is commanded in S205 to perform the song requested from the No. 3 karaoke terminal 19. Then, the channel number allotted to the X-karaoke performance device 5*x* is notified in S206 to the No. 3 karaoke terminal 19. As a result of S206, S106 of the processes of FIG. 4 will result in a positive determination. By selecting the notified channel, the No. 3 karaoke terminal 19 receives the high-frequency signal outputted from the X-karaoke performance device 5**x. The high-frequency signal includes an image signal and a sound signal corresponding to the requested song.

After notification in S206 of the channel number, whether or not there are any other requests is determined in S207. If not (S207:NO), then the program returns to S202. If other requests have been received (S207:YES), the program proceeds to S208, where whether or not any of the karaoke performance devices 5 are free is determined. That is, it is determined in S208 whether or not any of the karaoke performance devices 5 can be used for a karaoke performance. If not (S208:NO), then all karaoke terminals 19 from which a request was received, but for which insufficient karaoke performance devices 5 are available to allow a karaoke performance, are notified in S209 that requests can not be accepted and then the program returns to S202. The notifications performed in S206 and S209 for indicating channel number and impossibility of accepting request respectively are transmitted to the corresponding karaoke terminals 19 on the polling signal transmitted by polling control processes to be described later.

On the other hand, when one of the karaoke performance devices 5 is free so that S208 results in a positive determination, then whether or not a plurality of requests have been received is determined in S210. If not (S210:NO), then in S211 the karaoke performance device 5 determined as free in S208 is allotted to the requesting karaoke terminal 19 and commanded to perform the requested song. Then the channel number allotted to the free karaoke performance device 5 is notified in S212 to the requesting karaoke terminal 19 and the program returns to S202.

When it is determined in S210 that a plurality of requests have been received (S210:YES), then the program proceeds to S213, where the priority levels of the plurality of requesting karaoke terminals 19 are retrieved from the information provision priority table shown in FIG. 8 and compared. The karaoke terminal 19 with the highest priority level is allotted the free karaoke performance device 5. The free karaoke performance device 5 is commanded to performed the requested song. Then, the channel number allotted to the free karaoke performance devices 5 is notified in S214 to the requesting karaoke terminal 19 with the highest priority level. Then, the program returns to S208, where it is determined whether or not there are any other free karaoke performance devices 5.

For example, it will be assumed that requests are received from No. 1, 2, and 4 karaoke terminals 19 when priority levels are set as shown in FIG. 9. When these three requests are received, the program will proceed to S208 because none of the requests are from the No. 3 karaoke terminal 19. Assuming that one of the karaoke performance devices 5 is free, then S208 and S210 will result in positive determinations so that the program proceeds to S213. In S213, because only the No. 4 karaoke terminal 19 is set with a priority level B, then its request is given priority over the requests from the other two karaoke terminals 19. Then the program will again return to S208 via S214. If at this point no other karaoke performance devices 5 are free, then the program proceeds to S209, whereupon the No. 1 and 2 karaoke terminals 19 are notified that their requests can not be accepted at present.

On the other hand, if another one of the karaoke performance devices 5 is free (S208:YES), then the program again returns to S213 because a plurality of requests still remain. Because both of the requests are from karaoke terminals 19 set with the same priority level, then the next karaoke terminal 19 to which a karaoke performance device 5 is allotted can not be selected on the bases of priority level. In this case, the lower numbered karaoke terminal 19 can be selected. For example, the No. 1 karaoke terminal 19 can be given priority. Alternatively, the request received earliest during the three second period can be given priority.

Then, the program would again return to S208. At this point, at least two of the three karaoke performance devices 5 are in operation. That is, Y and Z (not shown) karaoke performance devices 5*y*, 5*z* (not shown) of the X through Z (not shown) karaoke performance devices 5*x*, 5*y*, and 5*z* (not shown) are in operation. The remaining X-karaoke performance device 5*x* is allotted to perform requests exclusively from karaoke terminals 19 set with the highest priority level A. Even if actually free, the X-karaoke performance device 5*x* is not determined as free except with regards to requests from karaoke terminals 19 set with priority level A. Therefore, in this example, S208 results in a negative determination so that in S209 a notification saying the request can not be met is transmitted to the requesting karaoke terminal 19. In this case, the output terminal either indicates that no requests can be accepted and makes the user wait or indicates that the user should attempt to request the karaoke song later.

Next, an explanation of processes performed in the karaoke performance devices 5 will be provided while referring to FIG. 8. The processes of FIG. 8 are executed in those karaoke performance devices 5 commanded by the central control device 9 in S205, S211, and S213 of FIG. 5 to start performance of a karaoke song.

As shown in FIG. 8, the CPU 52 of the karaoke performance devices 5 waits in S501 for a performance command from the central control device 9. When a performance command is received (S501:YES), then in S502 the CPU 52 receives from the central control device 9 the song number of the song to be performed. Next in S503, the CPU 52 transmits the song number received in S502 to the communication server 3 via the LAN interface 51, thereby requesting transmission of karaoke song data for that song number. When the communication server 3 transmits the karaoke song data, the CPU 52 receives the data and stores it in the RAM 53.

Next, in S504 the CPU 52 retrieves the karaoke song data from the RAM 53 and executes processes for the karaoke performance. During karaoke performance processes the CPU 52 transmits the performance data included in the karaoke song data to the sound source 56. The digital performance data is converted to an analog performance sound signal and outputted to the modulator 15. In synchronization with the performance data, the CPU 52 transmits lyric data to the image composing device 55 and superimposes the lyric data on a background image signal outputted from the image devices 7 and transmits the resultant signal to the modulators 15 as an analog display signal. The modulator 15 transmits to the amplifier 13 a signal produced by modulated the performance sound signal and display signal into a predetermined high frequency. The head amp 13 transmits the high-frequency signal inputted from the amplifier 15 over the main line 17 on the channel allotted for the corresponding karaoke performance device 5.

The CPU 52 then waits in S505 for the processes of S504 to be completed. Once the karaoke performance is completed (S505:YES), then in S506 the CPU 52 notifies the central control device 9 that the karaoke performance has been completed. The central control device 9 receives this notification via S301 of the interrupt routine shown in FIG. 6. Upon receiving the notification, the central control device 9 performs the other processes of the interrupt routine of FIG. 6.

Next, an explanation of the interrupt routine executed in the central control device 9 will be provided. As shown in FIG. 6, when this interrupt routine is started, the CPU 91 determines whether or not the transmission which started the interrupt routine was a notification from a karaoke performance device 5 that its karaoke performance has been completed. If not (S301:NO), then other processes appropriate for the situation are executed in S305, and the program returns to the main routine.

On the other hand, if the transmission was a notification from a karaoke performance device 5 that its karaoke performance has been completed (S310:YES), then the CPU 91 proceeds to the processes of S302 through S304.

In S302, the CPU 91 stores in the RAM 93 that the karaoke performance device 5 which transmitted the notification is now free. In S303, the CPU 91 uses the polling control processes shown in FIG. 7 to attach a notification, which informs the requesting karaoke terminal 19 that the karaoke performance device 5 which sent the performance completed notification received in S310 has completed the song performance, to a polling signal and to transmit the notification to the requesting karaoke terminal 19. Then, in S304 the CPU 91 commands a cue table in the RAM 93 to be updated, whereupon the interrupt routine of FIG. 6 is completed. The cue table is a flag or similar means showing that a particular karaoke performance device 5 is free and so capable of accepting a request. When the cue table is updated in this way to show that one of the karaoke performance devices 5 is free, then S208 of FIG. 5 will result in a positive determination.

Next, an explanation of the polling control routine will be provided while referring to FIG. 7.

First, the terminal number is set to 1 in S401. Then in S402, a polling signal is transmitted to the No. n karaoke terminal 19, which will be the No. 1 karaoke terminal 19 directly after the polling control routine has started. The polling signal has attached thereto the address code of the No. n terminal. The karaoke terminals 19 determine whether or not the polling signal is for itself by referring to the address code. In addition to the address code of the No. n terminal, various other information, such as the booking condition at the center as updated in S305 and S309, channel notifications of S206 of FIG. 5, and performance completed notifications of S303 of FIG. 6 are attached to these polling signals and transmitted to the karaoke terminals 19.

Next, the central control device 9 receives in S403 a response signal transmitted by the No. n karaoke terminal 19 over a predetermined channel in response to the polling signal. Whether or not the response is a song request is determined in S404. If so (S404:YES), then the request data including the song number of the requested song is stored in S405 and the program proceeds to S406. It should be noted that requests are received in S202 and the determination of S203 of FIG. 5 are made based on the request data stored in S405.

On the other hand, if no request is determined to have been received in S404, then the program proceeds to S406.

In S406, the terminal number is incremented by 1 (n=n +1). Then, it is determined in S407 whether or not the No. n terminal is greater than a maximum No. N terminal, which is the karaoke terminal 19 with the largest number of all the karaoke terminals 19 connected to the system. If not (S407:NO), then the program again returns to S402, whereupon the processes of S402 through S406 are again performed, this time on the n+1–No. karaoke terminal 19. On the other hand, if the terminal No. n is greater than the maximum terminal No. N (S407:YES), then the program returns to S401, where the terminal No. n is again set to 1. Then the processes of S402 through S405 are again performed on the No. 1 karaoke terminal 19. That is, after polling has been performed consecutively on all terminals No. 1 through N, then polling is performed again starting with the No. 1 terminal.

In the information provision system 1 described above, a channel is allotted for each karaoke performance device 5. Therefore, independent karaoke performances can be provided to customers at a number of karaoke terminals 19 equalling the number of karaoke performance devices 5. Requests can be processed based on a predetermined set priority rather than on an equal basis from all karaoke terminals 19.

For example, requests from a karaoke terminal 19 set with A priority level can be processed given first priority over other karaoke terminals 19 set with B or C priority levels. On the other hand, requests from karaoke terminals 19 set with priority levels other than A priority level will not necessarily be rejected. When a number of requests are received within a predetermined period of time from the karaoke terminals 19 set with B or C priority levels, a command will be given to execute information processes for the karaoke terminal 19 with the higher priority setting. Although requests are normally processed based on the order of their receipt, a request from a karaoke terminal 19 set with B priority level will be processed before a request from a karaoke terminal 19 set with C priority level, even if the request from a karaoke terminal 19 set with C priority level was received earlier on in the predetermined time period.

In the above-described embodiment, the X-karaoke performance device 5*x* was fixedly allotted for executing karaoke performance processes exclusively for the No. 3 karaoke terminal 19, which was set with the highest-priority level A. However, there is no need to provide a fixed karaoke performance device 5 for highest-priority level karaoke terminals 19. As an alternative, any one karaoke performance device 5 can be kept free for the No. 3 karaoke terminal 19. For example, because three karaoke performance devices 5 are provided in the above-described embodiment, when two of the three are performing karaoke performance processes for karaoke terminals 19 set with B or C priority, then the remaining karaoke performance device 5 can be kept available for the No. 3 karaoke terminal 19 by refusing further requests from karaoke terminals 19 set with B or C priority levels.

The following effects can be obtain by the information provision system 1 according to the present embodiment.

When a karaoke terminal 19 is provided for each room of some establishments, such as multi-roomed drinking establishments or hotels, it is unlikely that requests will be received from all of karaoke terminals 19 at once. For this reason, more karaoke terminals 19 are provided than karaoke performance devices 5 in the present invention.

That is, an output terminal capable of outputting sound and images is provided to each room, but fewer data provision devices are provided in a control room. One of the data provision devices is operated when a request is accepted from one of the output terminals. Because the information provision system according to the present invention has fewer data provision devices than output terminals, karaoke information can be provided to each output terminal less expensively in establishments where it is assumed that not all of the output terminals will be used at the same time.

However, if requests are concentrated in one time period so that all the data provision devices are in operation at the same time, temporarily some customers will not be able to enjoy karaoke. That is, some requests will remain unanswered when the number of requests surpasses the number of data provision devices. However, adverse effects of not being able to sing karaoke will be stronger for some customers than others. For example, not being able to sing karaoke will be disappointing for customers whose main objective is to sing karaoke.

Karaoke information can be effectively provided from the data provision devices to output terminals by giving priority to output terminals according the needs of the establishment where the system is in use. In this case, the central device receives all of the requests from the output terminal devices at once. Requests are fulfilled as allowed by the number of data provision devices by giving priority to certain output terminals.

That is, even if normally requests are processed in order of when the request was received, high-priority requests are processed before low-priority requests even if the low-priority request is received first within a predetermined time period. Therefore, if requests become concentrated during a certain time period, the probability of an output terminal receiving information increases with its level of priority. However, priority will sometimes not be given to higher priority output terminals when two requests are received during different time periods. That is, priority levels enhance probability that information will be provided for a request from a higher priority terminal.

On the other hand, when a karaoke terminal 19 is set with a highest-priority level A, then regardless of the condition when its request was received, information can be provided giving highest priority to the highest-priority karaoke terminal 19 without hindrance from requests from other karaoke terminals 19. Therefore, the karaoke terminals 19 of banquet halls and suite rooms can be set with the highest-priority level A so that requests from these karaoke terminals 19 will be accepted no matter what the circumstances.

Accordingly, in hotels and drinking establishments using the information provision system 1, the needs of a number of karaoke terminals 19 can be satisfied by a smaller number of karaoke performance devices 5. Therefore, the information provision system 1 is cost effective because external output is possible in all rooms and areas without a karaoke performance device 5 being provided for each room or area.

According to the present embodiment, the priority level in the information can be set and changed using the keyboard of the central control device 9. Therefore, not only can priority level be appropriately set according needs of the facility area, but priority level can be changed temporarily according to the needs or the atmosphere of the area where the karaoke terminals 19 are provided.

For example, regardless of whether a request has been received from a karaoke terminal 19 set with the highest-priority level A, the X-karaoke performance device 5*x* can not be used to provide karaoke performances for request from any other karaoke terminals 19. However, there is no reason to maintain the X-karaoke performance device 5*x* out of operation during time periods when the areas where the highest-priority level karaoke terminals 19, that is, the suite or banquet halls, are provided are being used. For example, no requests can be expected from an karaoke terminal 19 in a banquet hall or a suite room for which no reservations have been made so setting aside a karaoke performance device 5 for that banquet hall would be poorly cost effective. In the case of a suite room, a decision about whether a reservation has been made or whether or not the occupant is in the room can be made on the spot. The karaoke terminal 19 in the suite room can be given highest-priority level A for only those times when the occupant can be expected to be in the suite room. At other times it can be given the lowest priority level C. In this way, information can be efficiently provided.

While the invention has been described in detail with reference to specific embodiments thereof, it would be apparent to those skilled in the art that various changes and modifications may be made therein without departing from the spirit of the invention, the scope of which is defined by the attached claims.

For example, the present invention can be applied not only to karaoke systems, but to any system where more devices are provided for outputting data than for providing data. Information provision system need not be limited to providing karaoke performance data, but could be applied to any system where output terminals are provided in rooms or areas separated from information provision devices.

What is claimed is:

1. An information provision system comprising:

a plurality of information provision devices for providing external-output information, each information provision device including:

memory means for storing data; and information processing means for using the data stored in the memory means to prepare external-output information;

a transmission unit for conveying external-output information provided by the information provision devices;

a plurality of output terminals in a number greater than the plurality of information provision devices, each output terminal including:

input means by which requests for provision of external-output information are inputted;

request transmission means for transmitting, according to commands inputted via the input means, requests for provision of external-output information; and information output means for externally outputting information based on external-output information received from an information provision device via the transmission unit; and a central control device including:

request receiving means for receiving requests transmitted from request transmission means;

a priority storage means for storing, for each output terminal, a priority level at which external-output information is to be provided; and command means for commanding, according to requests received by the request receiving means and according to priority level stored for requesting output terminals, an information provision device to provide external-output information requested in a request received by the request receiving means.

2. An information provision system as claimed in claim 1, wherein the transmission unit is a multi-channel transmission unit for conveying external-output information over a plurality of channels that are allotted to respective information provision devices;

each output terminal further includes:

channel selection means connected to the multi-channel transmission unit and for selecting a channel of the plurality of channels; and channel command means for commanding the channel selection means to select a channel over which external-output information is to be conveyed by the transmission unit;

the information output means externally outputs information based on external-output information received from the multi-channel transmission unit over a channel selected by the channel selection means; and the central control device further includes channel notification means for notifying a requesting output terminal an allotted channel over which external-output information from a selected information provision device will be transmitted, the channel command means of the requesting output terminal commanding the channel selection means of the requesting output terminal to select a channel accordingly.

3. An information provision system as claimed in claim 2 wherein the command means commands an information provision device based on priority level stored in the priority storage means when the request receiving means receives a plurality of requests within a predetermined duration of time.

4. An information provision system as claimed in claim 3 wherein the central control device further includes a priority level setting changing means for setting and changing priority level stored in the priority storage means for each output terminal.

5. An information provision system as claimed in claim 3 wherein the priority storage means further stores a highest-priority level for a highest-priority output terminal of the output terminals; and wherein the command means gives priority to a request from the highest-priority output terminal over requests from other output terminals when commanding information provision devices to provide external-output information.

6. An information provision system as claimed in claim 5 wherein the central control device further includes a priority level setting changing means for setting and changing priority level stored in the priority storage means for each output terminal.

7. An information provision system as claimed in claim 5 wherein the plurality of information provision devices further comprises an exclusive information provision device, the exclusive information provision device being fixedly set for executing information processes exclusively for the highest-priority output terminal, the command means commanding the exclusive information provision device to provide external-output information in response to a request from the highest-priority output terminal and commanding an information provision device to provide external-output information in response to a request from an output terminal other than the highest-priority output terminal.

8. An information provision system as claimed in claim 7 wherein the central control device further includes a priority level setting changing means for setting and changing priority level stored in the priority storage means for each output terminal.

9. An information provision system as claimed in claim 2 wherein the priority storage means further stores a highest-priority level for a highest-priority output terminal of the output terminals; and wherein the command means gives priority to a request from the highest-priority output terminal over requests from other output terminals when commanding information provision devices to provide external-output information.

10. An information provision system as claimed in claim 9 wherein the central control device further includes a priority level setting changing means for setting and changing priority level stored in the priority storage means for each output terminal.

11. An information provision system as claimed in claim 9 wherein the plurality of information provision devices further comprises an exclusive information provision device, the exclusive information provision device being fixedly set for executing information processes exclusively for the highest-priority output terminal, the command means commanding the exclusive information provision device to provide external-output information in response to a request from the highest-priority output terminal and commanding an information provision device other than the exclusive information provision device to provide external-output information in response to a request from an output terminal other than the highest-priority output terminal.

12. An information provision system as claimed in claim 11 wherein the central control device further includes a priority level setting changing means for setting and changing priority level stored in the priority storage means for each output terminal.

13. An information provision system as claimed in claim 2 wherein the central control device further includes a priority level setting changing means for setting and changing priority level stored in the priority storage means for each output terminal.

14. An information provision system as claimed in claim 2 wherein:

each information provision device is a karaoke performance device and the information processing means of said information provision device preparing karaoke performance information by using karaoke data stored in the memory means;

each output terminal is a karaoke terminal, the request transmission means of said output for transmitting song requests according to songs input inputted via the input means; and the information output means of said output terminal for outputting sound according to the karaoke performance information; and the central control device is a karaoke central control device, the request receiving means of said central control device for receiving song requests; and the command means of said central control device for commanding to the karaoke performance devices to prepare karaoke performance information for songs corresponding to the requests.

15. An information provision system as claimed in claim 14 wherein each karaoke performance device further includes an image signal output means for outputting image signals including lyric signals for display of lyrics, and wherein each karaoke terminal further includes display means for displaying images based on the image signals received from the karaoke performance device via the multi-channel transmission unit.

16. An information provision system as claimed in claim 1 wherein the command means commands an information provision device based on priority level stored in the priority storage means when the request receiving means receives a plurality of requests within a predetermined duration of time.

17. An information provision system as claimed in claim 16 wherein the priority storage means further stores a highest-priority level for a highest-priority output terminal of the output terminals; and wherein the command means gives priority to a request from the highest-priority output terminal over requests from other output terminals when commanding information provision devices to provide external-output information.

18. An information provision system as claimed in claim 17 wherein an exclusive information provision device of the plurality of information provision devices is fixedly set for executing information processes exclusively for the highest-priority output terminal, the command means commanding the exclusive information provision device to provide external-output information in response to a request from the highest-priority output terminal and commanding an information provision device other than the exclusive information provision device to provide external-output information in response to a request from an output terminal other than the highest-priority output terminal.

19. An information provision system as claimed in claim 18 wherein the central control device further includes a priority level setting changing means for setting and changing priority level stored in the priority storage means for each output terminal.

* * * * *